(12) United States Patent
Lederer

(10) Patent No.: US 10,546,115 B2
(45) Date of Patent: Jan. 28, 2020

(54) METHOD FOR AUTHENTICATING A USER DEVICE DURING THE PROCESS OF LOGGING INTO A SERVER

(71) Applicant: Unify GmbH & Co. KG, München (DE)

(72) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 316 days.

(21) Appl. No.: 15/520,778

(22) PCT Filed: Oct. 15, 2015

(86) PCT No.: PCT/EP2015/002039
§ 371 (c)(1),
(2) Date: Apr. 20, 2017

(87) PCT Pub. No.: WO2016/062386
PCT Pub. Date: Apr. 28, 2016

(65) Prior Publication Data
US 2017/0316198 A1  Nov. 2, 2017

(30) Foreign Application Priority Data

Oct. 24, 2014 (DE) ........................ 10 2014 015 814

(51) Int. Cl.
*G06F 21/44* (2013.01)
*H04L 29/06* (2006.01)
(52) U.S. Cl.
CPC ............ *G06F 21/44* (2013.01); *H04L 63/083* (2013.01); *H04L 63/0838* (2013.01); *G06F 2221/2103* (2013.01); *G06F 2221/2137* (2013.01)
(58) Field of Classification Search
CPC ..... G06F 21/31; H04L 63/083; H04L 9/0863; H04L 63/1483

(Continued)

(56) References Cited

U.S. PATENT DOCUMENTS 8,661,254 B1    2/2014  Sama
8,838,973 B1 *  9/2014  Yung ................... H04L 63/1483
                                                        713/165

(Continued)

FOREIGN PATENT DOCUMENTS

EP      0734000 A2    9/1996
WO   2010116109 A1   10/2010

OTHER PUBLICATIONS

Notification of Transmittal of Translation of the International Preliminary Report on Patentability for PCT/EP2015/002039 dated May 4, 2017.

(Continued)

*Primary Examiner* — Bryan F Wright
(74) *Attorney, Agent, or Firm* — Buchanan Ingersoll & Rooney PC

(57) ABSTRACT

A computer system and method for authenticating a user device associated with a user during the process of logging into a server. The server can generate input requests each of which is valid only during a defined time period, and displays said input requests in succession in a login screen. The user device reads in the input request displayed at the time of the login and calculates a response by using said input request, the password of the user device, and the current time. The user device transmits the calculated response to the login screen and the response is transmitted by the login screen to the server. The server confirms the authentication when the response calculated by the server matches the response transmitted by the user device.

19 Claims, 2 Drawing Sheets

| User Device | User ID | Password | Current Response | Previous Response |
|---|---|---|---|---|
| B1 | IDB1 | PB1 | AS1 | AS1v |
| B2 | IDB2 | PB2 | AS2 | AS2v |
| ⋮ | ⋮ | ⋮ | ⋮ | ⋮ |
| Bm | IDBm | PBm | ASm | ASmv |
| ⋮ | ⋮ | ⋮ | ⋮ | ⋮ |
| Bn | IDBn | PBn | ASn | ASnv |

(58) Field of Classification Search
USPC .............................................................. 726/7
See application file for complete search history.

(56) References Cited

U.S. PATENT DOCUMENTS

| | | | |
|---|---|---|---|
| 9,781,102 B1* | 10/2017 | Knjazihhin | H04L 63/083 |
| 2006/0037064 A1* | 2/2006 | Jeffries | G06F 21/31 |
| | | | 726/4 |
| 2010/0007075 A1 | 1/2010 | Ito et al. | |
| 2010/0070759 A1 | 3/2010 | Leon Cobos et al. | |
| 2011/0197266 A1* | 8/2011 | Chu | H04L 9/3228 |
| | | | 726/5 |
| 2013/0133086 A1 | 5/2013 | Liberman et al. | |
| 2013/0185779 A1 | 7/2013 | Tamai et al. | |
| 2014/0114824 A1* | 4/2014 | Kong | G06Q 10/1091 |
| | | | 705/32 |
| 2015/0215310 A1* | 7/2015 | Gill | H04L 63/0853 |
| | | | 726/7 |
| 2015/0318998 A1* | 11/2015 | Erlikhman | H04L 9/32 |
| | | | 713/171 |
| 2017/0195316 A1* | 7/2017 | Murdoch | H04L 9/0863 |
| 2017/0346851 A1* | 11/2017 | Drake | H04L 63/1466 |

OTHER PUBLICATIONS

English Translation of the International Preliminary Report on Patentability for PCT/EP2015/002039 dated May 4, 2017.

* cited by examiner

Fig. 2

| User Device | User ID | Password | Current Response | Previous Response |
|---|---|---|---|---|
| B1 | IDB1 | PB1 | AS1 | AS1v |
| B2 | IDB2 | PB2 | AS2 | AS2v |
| ⋮ | ⋮ | ⋮ | ⋮ | ⋮ |
| Bm | IDBm | PBm | ASm | ASmv |
| ⋮ | ⋮ | ⋮ | ⋮ | ⋮ |
| Bn | IDBn | PBn | ASn | ASnv |

Fig. 3

| Time | t1 | t2 | .................. | tx |
|---|---|---|---|---|
| Input Request | Et1 | Et2 | .................. | Etx |

# METHOD FOR AUTHENTICATING A USER DEVICE DURING THE PROCESS OF LOGGING INTO A SERVER

CROSS-REFERENCE TO RELATED APPLICATIONS

This application is the United States national phase under 35 U.S.C. § 371 of International Application No. PCT/EP2015/002039, which was filed on Oct. 15, 2015 and claims priority to DE 10 2014 015 814.4, filed on Oct. 24, 2014.

BACKGROUND OF THE INVENTION

Field of Invention

This invention concerns a method for authenticating a user device assigned to a user during the process of logging into a server.

Background of the Related Art

Known methods for authenticating a user or a user device during the process of logging into a server are also called logins, and can be used for authentication or for logging into portals, computers, or VPN networks, for example. These types of methods involve the user providing a user name—also known as a user ID or login ID—as well as a password. Enhancements to increase security include 2-factor authentication, which in addition requires a generated token (such as an RSA SecurID, for example), or a so-called challenge-response method for additional security. However, these known methods still require entry of the user ID and also the transfer of this user ID. Another known authentication method is "Sesame" from Google: Here a user name and password are transferred to the server via a separate path, i.e., not by a web terminal but rather by a private smart phone, and then mapping takes place through a session ID that is scanned and transmitted to a website by a QR code.

In addition, the use of biometric methods is known, which normally eliminates entering a user ID. However, a disadvantage of such biometric methods is that a higher technical expenditure is required—such as an iris scanner or a fingerprint sensor—in order to read the user's secure biometric data.

With these methods it is considered a disadvantage that the user not only has to enter a password, but still must also provide his user ID. This process is considered to be too involved.

BRIEF SUMMARY OF THE INVENTION

Embodiments provide authentication processes. Using the invented method, a user with a user device assigned to him can only log into a server and be authenticated if his user device is already known to the server, i.e., belongs to a user device group that is known to the server. In addition, both the user ID and the password of the user device in question or the entire group are known to the server. The procedure according to the invention is as follows: The server generates or produces input requests (also called challenges) that are only valid for a defined length of time, and displays these input requests in sequence, but only one at a time, on a login screen.

When a user device wishes to log in and be authenticated, it reads the input request displayed at the time of the loging by manual input through the user, for example—and calculates an answer—often also called a response—using this input request, its password, and the current time. Then the user device transmits the calculated response to the login screen, after which the response is transferred from the login screen to the server. The server then calculates a respective response for at least part of the user device group, using the input request displayed at the time of the login, the respective password, and the current time, and compares the responses calculated by it to the response transmitted by the user device.

BRIEF DESCRIPTION OF THE FIGURES

Additional advantages, features, and characteristics of the present invention are presented in the following description of advantageous embodiments with reference to the drawing. The figures show schematically:

FIG. 2 an enlarged representation of a memory unit for managing the user devices and the data assigned to it; and FIG. 3 an overview of the input requests, responses, times, and user devices involved.

DETAILED DESCRIPTION OF THE INVENTION

Figure 1:
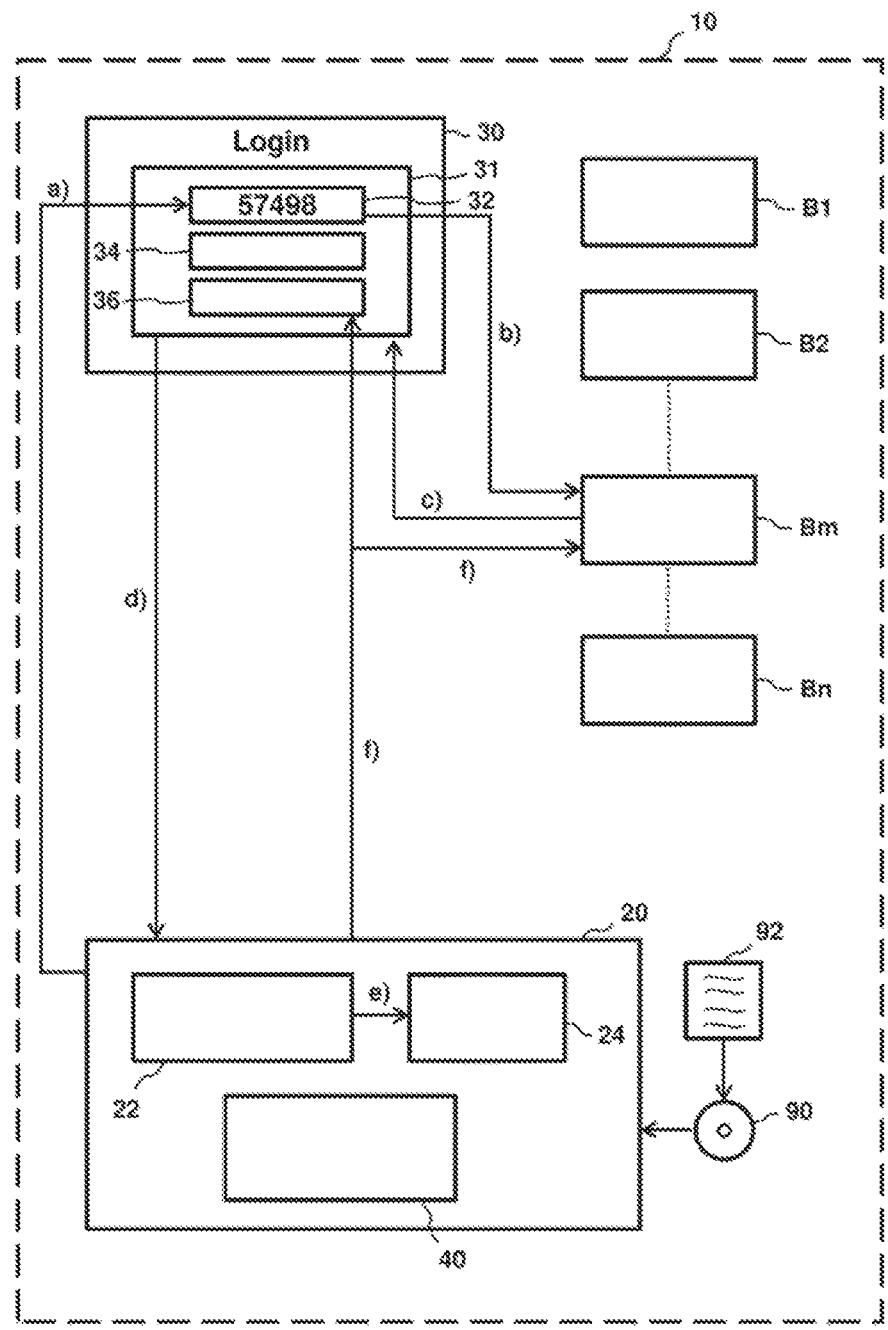
FIG. 1 an overview of one embodiment of a computer system according to the invention, in which the sequence of the invented method can be seen.

As noted above, embodiments provide authentication processes. Using the invented method, a user with a user device assigned to him can only log into a server and be authenticated if his user device is already known to the server, i.e., belongs to a user device group that is known to the server. In addition, both the user ID and the password of the user device in question or the entire group are known to the server. The procedure according to the invention is as follows: The server generates or produces input requests (also called challenges) that are only valid for a defined length of time, and displays these input requests in sequence, but only one at a time, on a login screen.

When a user device wishes to log in and be authenticated, it reads the input request displayed at the time of the login—by manual input through the user, for example—and calculates an answer—often also called a response—using this input request, its password, and the current time. Then the user device transmits the calculated response to the login screen, after which the response is transferred from the login screen to the server. The server then calculates a respective response for at least part of the user device group, using the input request displayed at the time of the login, the respective password, and the current time, and compares the responses calculated by it to the response transmitted by the user device.

The phrase "for at least part of the user device group" should be understood to mean that the server does not have to calculate one response for the entire user device group and compare it with the response sent by the user device, but rather it is sufficient if it calculates the respective responses—according to a previously defined sequence, for example (prioritized according to the prior login frequency for that particular device, for example), or according to a sequence generated by a random number generator—and compares them to the response transmitted by the user device. This continues until it establishes a match. In one extreme case, this could mean that the first response calculated by the server already matches the response sent by the user device, or in the other extreme case, the server could actually have to calculate all the responses for user groups known to it and compare them to the transmitted response, because only the last response calculated results in a match.

For each user device for which the response calculated by the server matches the response transmitted by the user device, the server then confirms the authentication and that particular user device is thereby logged into the server.

It can be seen that the login process or authentication according to the invention is much simpler, because only one piece of information has to be provided and transferred, without also having to transfer an individual user ID.

The fact that each input request is only valid for a defined length of time means that, after that time period expires, a new input request is generated and displayed. This increases the authentication method's security against so-called brute-force attacks.

According to one embodiment of the invented method, in order to increase security, authentication can be run twice in succession, wherein the first authentication is considered only preliminary and "full" authentication can only be accepted after a second authentication takes place, wherein the time at which the second input request was displayed is used as the current time. In this regard. the server's calculation effort for the "second round" of authentication can be significantly reduced by having the server calculate only one response for the previously authenticated user device and not for a large portion of the user device group, in order to compare the single calculated response to the response transmitted by the user device.

For seamless execution of the authentication process, it is advantageous if the times used for calculating the input requests comprise a specific defined time window which is long enough that the response calculated by the user device can normally be sent back to the server within this time window, after which the server can calculate the various responses to the input request for the individual user devices using this current time with the long time window. In other words, the time window should be long enough, and therefore the "current time" indicated imprecisely enough, that the server, when calculating its various responses, "sees" or perceives the same time as the user device does when calculating its response to the input request before sending this response to the server. Such a time window should preferably be 30-60 seconds long.

According to one preferred embodiment of the invented method, this includes the following additional steps: For the affected portion of the user device group, the server not only calculates a single response using the respective current time or input request, but also calculates an additional response using the respective previous input request and the then-valid current time, and for each user device compares the two calculated responses to the response transmitted by the user device to be authenticated, after which it confirms the authentication of the particular user device for which the response calculated by the server for the current input request or the preceding input request matches the response transmitted by the user device. This ensures that responses from a user device to be authenticated can still be recognized as correct if, in spite of having an appropriately long time window, they reach the server late enough that it has already generated the next input request and prepared to calculate its responses. In this case, a user who wishes to log the affected user device into the server is spared having to authenticate it again when it actually did authenticate correctly the first time.

According to one preferred embodiment of the invented method, the input request is generated and displayed as a QR code. Especially when using smart phones, such a QR code can be scanned in, allowing a corresponding response to be calculated easily. This embodiment is significantly more convenient for users of smart phones or similar devices equipped with a QR code scanner.

As a variation, according to the invention it is also possible, when calculating a respective input request, to use a random number—generated randomly by an appropriate random number generator, for example—instead of the respective current time, and having it also be valid only for a defined length of time.

According to one embodiment, it can be advantageous if an input request is generated and displayed only upon receipt of a query from a user device.

A hash calculation is normally used to calculate the response, and a so-called shared secret is inserted and used as the password. A so-called "pre-shared key" is generally used here, which is a longer sequence of randomly generated bytes. This process is described in detail at the webpage de.wikipedia.org/wiki/Pre-shared_key. This should not be confused with the fact that the answer or response is often stated as a One-Time Password (OTP), or a password or keyword that is used only once, that has nothing to do with the pre-shared key or password. Details about this can be found at http://de.wikipedia.org/wiki/Einmalkennwort.

A computer program product with program code for executing the previously explained method and a machine-readable data carrier on which the computer program product is stored are also considered part of this invention.

Embodiments may further include a computer system comprising: a server for generating respective input requests that are valid only for a defined length of time, for storing user IDs and passwords, and for calculating responses to the input requests; multiple user devices, each of which belongs to a user device group, has both a user ID and a password, and can calculate a response to the input requests; and a login screen assigned to the server for displaying the input requests and inputting the calculated responses, wherein the computer system according to the invention is distinguished in that the server has a control unit that executes the previously explained method.

FIG. 1 shows one embodiment of a computer system 10 according to the invention, based on which the invented method has been explained. A server 20 is connected to a website 30 or a so-called login screen, on which a login screen 31 is displayed and generates, in a step a), respective input requests Et1, Et2, . . . , Etx for each time t1, t2, . . . , tx (see FIG. 3), each of which is valid only for a defined length of time, typically 30 seconds. These input requests Et1-Etx are displayed individually in sequence by the server 20 on the login screen 31. In FIG. 1, for example, the number sequence 57498 is displayed as an input request in the input request window 32. In the embodiment shown, the login screen 31 includes a window 32 for the input request and a window 34 for the response.

FIG. 1 also shows user devices B1, B2, . . . , Bn, which belong to a corresponding user device group, are known to the server 20, and therefore can log into it. In a step b), a user device Bm reads the current input request Et2 that is displayed in this example at time t2 and calculates a response ABm using this input request Et2, the password PBm assigned to the user device Bm, and the current time t2. In a step c), the user device Bm transmits the calculated response ABm to the window 34 in the login screen 31, which in a step d) forwards the response ABm to the server 20. The server 20 now begins to calculate, sequentially or (if applicable, partially) in parallel for the devices B1-Bn, one response AS1-ASn for each of them, respectively using the login time for the displayed input request Et2, the respective passwords PB1-PBn, and the current time t2, and in a comparison unit 24 compares the responses AS1-ASn calculated by it in a response calculation unit 22 as rapidly as possible to the response ABm transmitted by the user device Bm. As soon as the server determines a match between the response ABm and a response ASm calculated by it, in a step f) it confirms the authentication of the affected user device Bm and so notifies the user device Bm. According to the embodiment shown in FIG. 1, this authentication confirmation is displayed in a confirmation window 36 on the login screen 31.

If authentication security needs to be improved, the process described in steps a) to f) can be repeated after a certain waiting period, at time t3, for example, in which case the authentication confirmed in step f) for the user device Bm is then considered only as preliminarily valid and authentication is not deemed fully valid until after successful completion of the second authentication round. In this case, for the second execution of step e), unlike the first one, only a single response for the preliminarily authenticated user device Bm needs to be calculated, which is compared to the response ABm transmitted by the user device Bm.

According to this embodiment, the times t1-tx are only given with 30-second precision and so comprise a 30-second time window during which the input requests Et1-Etx are valid, so that a user who is in a late phase of the display of the particular input request (here in example Et2), after calculating his response and returning it to the server 20, is still in this time window, within which the server 20 calculates its responses to the input request Et2 and compares with the response ABm from the user device Bm.

However, if the calculated response ABm for an input request Et1 generated by the user device Bm at a time t1, for example, reaches the server 20 too late, and the server is already displaying a new input request Et2 at time t2 and is calculating its responses AS1-ASn using this new input request Et2, then the server 20 also calculates responses AS1v-ASnv using the earlier input request Et1 that was generated at time t1 and compares these responses to the response ABm transmitted by the user device Bm and issues the authentication if there is a match between the response ABm and response ASmv calculated by the server 20 for the earlier time t1.

FIG. 1 also shows, purely schematically, a CD-ROM 90 as the data carrier on which a computer program 92 is stored, which implements the invented method and can be run on the computer system 10 or on the server 20.

FIG. 2 shows an example of a memory unit 40 for managing the user devices B1, B2, . . . , Bn and the passwords PB1, PB2, . . . , PBn assigned to them, as well as the responses AS1-ASn or AS1v-ASnv calculated by the server 20 at a certain time (t2, for example) and the preceding time (accordingly t1, for example).

FIG. 3 shows a table overview with an example of the allocation of the generated input requests Et1-Etx to the respective times t1-tx.

The invention was described using a smart phone as the user device to be logged in or authenticated. It is clear, however, that a "normal" computer wishing to log into the Internet or a local network on a server can also log in with the same method.

It should be noted that the features of the invention described by referencing the presented embodiments, for example the type and configuration of individual method steps and parameters, or configuration of the input requests and responses as well as the device components such as the memory and display units, can also be present in other embodiments, unless stated otherwise or prohibited for technical reasons. Not all features of individual embodiments described in combination must necessarily always be implemented in any one particular embodiment.

LIST OF REFERENCE INDICATORS

10=Computer system
20=Server
22=Response calculation unit
24=Comparison unit
30=Website
31=Login screen
32=Input request window
34=Response window
36=Confirmation window
40=Memory unit for managing user devices
90=Data carrier
92=Computer program product
ABm=Response calculated by user device Bm AS1-ASn=Responses calculated by the server
AS1v-ASnv=Responses calculated by the server for an earlier input request
B1-Bn=User devices
Et1-Etx=Input requests
IDB1-IDBn—User IDs for the user devices B1-Bn
PB1-PBn=Passwords for user devices B1-Bn
t1-tx=Times for calculating the input requests Et1-Etx

I claim:

1. A computer-implemented method for authenticating a user device assigned to a user during the process of logging into a server, wherein the user device belongs to a user device group known to the server and has a user ID as well as a password that are known to the server, the method comprising:
generating input requests by the server that are only valid for a defined length of time, and displaying these input requests in sequence, one at a time, on a login screen;
the user device reading a first input request of the input requests that is displayed at the time of the login and calculating a response using the first input request, its password, and a current time;
the user device transmitting the calculated response to the login screen without also transmitting the user ID;
transmitting the response by the login screen to the server without also transmitting the user ID;
calculating by the server a first respective response for at least part of the user device group, using the first input request displayed at the time of the login, the password of the user device, and the current time, and comparing the first respective response calculated by the server to the response transmitted by the user device;
confirming by the server the authentication for the user device in response to the first respective response calculated by the server matching the response to the first input request transmitted by the user device;
generating a second input request of the input requests by the server for display on the login screen after the confirming of the first respective response matches the response to the first input request;
the user device calculating a response using the second input request;

transmitting the response to the second input request to the server; and the server logging in the user device that transmitted the response that matches the first respective response calculated by the server after the response to the second input request is determined to match a second respective response to the second input request that is calculated by the server.

2. The method of claim 1,
wherein the generating of the second input request of the input requests by the server for display on the login screen occurs after a predefined waiting time period and the second input request is only valid for a defined length of time after the predefined waiting period;
wherein the second input request is displayed at a time after the predefined waiting period and the calculating of the response to the second input request uses the second input request, the password of the user device, and a current time;
wherein the transmitting of the response to the second input request to the server includes:
the user device transmitting the calculated response for the second input request to the login screen; and
transmitting the response to the second input request by the login screen to the server;
calculating by the server the second respective response for at least part of the user device group using the second input request, the password of the user device, and the current time, and comparing the second respective response calculated by the server to the response to the second input request transmitted by the user device;
confirming by the server the authentication for each user device for which the second respective response calculated by the server matches the response to the second input request transmitted by the user device.

3. The method of claim 1, wherein the server calculates only a single second respective response for comparing the second respective response to the response to the second input request transmitted by the user device.

4. The method of claim 1, wherein the times used in calculating the input requests each comprise a defined time window that is configured such that the response calculated by the user device is sendable back to the server within this time window, wherein the time window is 30-60 seconds long.

5. The method of claim 1, further comprising steps of:
calculating, by the server, a third respective response for at least part of the user device group, using the second input request, the password of the user device, and a time that was valid during the second input request.

6. The method of claim 1, comprising generating a QR code and displaying the QR code as the first input request.

7. The method of claim 1, wherein a random number is used to calculate the first input request, the method also comprising substituting a random number for the current time for generating the first input request, wherein said random number is valid only for a defined length of time.

8. A non-transitory computer readable medium having code that, when executed, defines a method performed by a server that executes the code, the method comprising:
generating input requests by the server that are only valid for a defined length of time, and displaying these input requests in sequence, one at a time, on a login screen so that each of the input requests is readable by a user device at a time of logging in to the server;

in response to the server receiving a calculated response to a first input request of the input requests from the user device that was transmitted via the login screen in which the response to the first input request was generated based on the first input request displayed via the login screen, a password of the user device, and a current time, the server calculating a first respective response for at least part of a user device group to which the user device is assigned using the first input request, a password of the user device, and a current time, and comparing the first respective response calculated by the server to the response to the first input request transmitted by the user device;
confirming by the server the authentication for the user device when the first respective response calculated by the server matches the response to the first input request transmitted by the user device;
generating a second input request of the input requests by the server for display on the login screen after the confirming of the first respective response matching the response to the first input request;
transmitting the second input request for display on the login screen; and
the server logging in the user device that transmitted the response to the first input request that matches the first respective response calculated by the server after a response to the second input request from the user device is determined to match a second respective response to the second input request calculated by the server.

9. The non-transitory computer readable medium of claim 8, wherein the code is program code that is executable by at least one processor.

10. A computer system for authenticating a user device assigned to a user during the process of logging into a server, comprising:
a server for generating input requests that are valid only for a defined length of time, storing user IDs and passwords, and calculating responses to the input requests;
multiple user devices, each of which belongs to a user device group and has both a user ID and a password and each of which can calculate a response to the input requests, the multiple user devices including a first user device; and
a login screen assigned to the server for displaying the input requests and inputting the calculated responses,
wherein the server comprises a non-transitory memory and a controller configured to:
generate input requests that are only valid for a defined length of time to display these input requests in sequence, one at a time, on the login screen so that each of the input requests is readable by the user devices at a time of logging in to the server;
in response to the server receiving a calculated response to a first input request of the input requests from the first user device that was transmitted via the login screen, calculate a first respective response for at least part of a user device group to which the first user device is assigned using the first input request, the password of the first user device, and a current time, and comparing the first respective response calculated by the server to the response to the first input request transmitted by the first user device;
confirming authentication for the first user device for which the first respective response calculated by the server matches the response to the first input request transmitted by the first user device;

generate a second input request of the input requests by the server for display on the login screen after confirmation of the first respective response matching the response to the first input request;

transmit the second input request for display on the login screen; and login the first user device that transmitted the response to the first input request that matches the first respective response calculated by the server after a response to the second input request is determined to match a second respective response to the second input request calculated by the server.

11. The computer system of claim 10, wherein the controller is also configured so that prior to the server logging in the first user device that transmitted the response to the first input request that matches the first respective response calculated by the server, the server waits a predetermined waiting period before transmitting the second input request, and, in response to receiving the response to the second input request transmitted by the first user device via the login screen, the server calculates the second respective response for at least part of the user device group using the second input request, the password of the first user device, and a current time, and compares the second respective response calculated by the server to the response to the second input request transmitted by the first user device; and the server confirms the authentication for the first user device in response to the second respective response calculated by the server matching the response to the second input request transmitted by the first user device.

12. The computer system of claim 11, wherein the first user device is a smart phone.

13. The computer system of claim 10, wherein the controller calculates a third respective response for at least part of the user device group using the second input request, the password of the first user device, and a time that was valid during the second input request, and also compares the third respective response to a response to the earlier second input request that was transmitted by the first user device; and wherein logging in the first user device that transmitted the response to the first input request that matches the first respective response occurs after the response to the second input request matches the third respective response calculated by the server.

14. The computer system of claim 10, wherein the first input request comprises a QR code.

15. The computer system of claim 10, wherein the current time is used for generation of the first input request.

16. The computer system of claim 10, wherein a random number that is only valid for a defined length of time is used for generation of the first input request.

17. The computer system of claim 10, wherein the response to the first input request received from the first user device that was transmitted via the login screen was provided to the server without the user ID for the first user device also being transmitted with the response to the first input request.

18. The non-transitory computer readable medium of claim 8, wherein the transmitting of the second input request for display on the login screen occurs after a predefined waiting time period; and the method also comprises:

in response to receiving the response to the second input request from the user device, the server calculating the second respective response for at least part of the user device group using the second input request, the password of the user device, and the current time, and comparing the second respective response calculated by the server to the response to the second input request transmitted by the user device; and confirming by the server the authentication for the user device when the second respective response calculated by the server matches the response to the second input request transmitted by the user device.

19. The non-transitory computer readable medium of claim 8, wherein the method also comprises:

calculating, by the server, a third respective response for at least part of the user device group, using the second input request;

confirming, by the server, the authentication for the user device when the third respective response calculated by the server matches the response to the second input request that was transmitted by the user device.

* * * * *